(No Model.)

J. W. DOUBLEDAY.
Punch.

No. 236,420. Patented Jan. 11, 1881.

Witnesses:
N. N. Low
J. S. Barker.

Inventor:
James W Doubleday
by Doubleday & Bliss
atty

UNITED STATES PATENT OFFICE.

JAMES W. DOUBLEDAY, OF BINGHAMTON, N. Y., ASSIGNOR OF ONE-HALF TO HENRY H. DOUBLEDAY, OF WASHINGTON, D. C.

PUNCH.

SPECIFICATION forming part of Letters Patent No. 236,420, dated January 11, 1881.

Application filed September 3, 1880. (No model.)

*To all whom it may concern:*

Be it known that I, JAMES W. DOUBLEDAY, a citizen of the United States, residing at Binghamton, in the county of Broome and State of New York, have invented certain new and useful Improvements in Punches; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
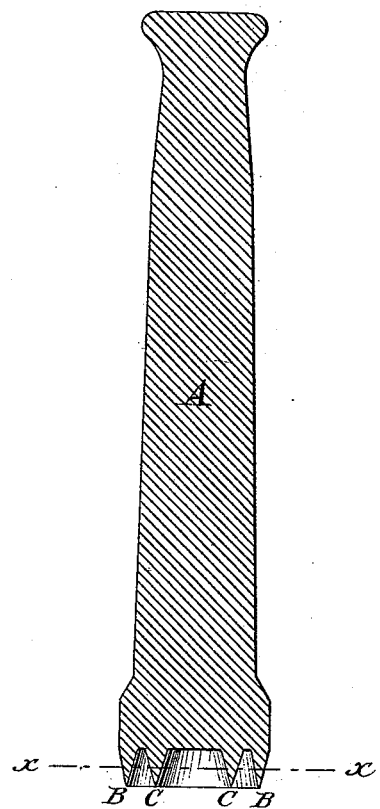
Figure 2:
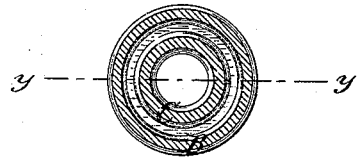

Figure 1 is a vertical section taken on line $y\ y$ of Fig. 2, and Fig. 2 is a transverse section taken on line $x\ x$, Fig. 1.

The object of this invention is to produce a punch which will cut at a single operation a washer from any suitable material, such as leather, pasteboard, rubber, or other substance which is manufactured in sheets or strips, and is adapted to be used for packing joints or for similar purposes.

In the drawings, A is the shank or body of the punch. B is the outer cutting-ring, and C the inner cutting-ring, arranged within and concentric to the outer one. Each cutting-ring is wedge-shaped in cross-section, as is plainly shown in Fig. 1, and terminates in a sharp cutting-edge, the edges of both rings being in the same plane. Both rings, B and C, are made in one and the same piece with the shank A, or, when preferred, they may be made in separate parts and afterward united to the shank by welding, or by being shrunk on. I usually prefer to finish the rings B C in a lathe to insure their being made with accuracy.

The material for the washer is forced upward between the adjacent beveled or wedging faces of the cutting-rings, and is ejected therefrom by either its own elasticity or by the force of the air which is compressed between the upper surface of the washer and the apex of the V-shaped annular groove between these rings, or by means of both these agencies co-operating; and in order to facilitate the discharge of the washer the sides of the rings should be smoothly finished. The central piece, which is cut out by the inner ring, C, is discharged in a similar manner.

I have shown the annular groove as having imperforate sides and top, and therefore air-tight when the lower part is closed by a washer, and while I prefer this construction, because I believe that it facilitates the discharge therefrom of the washer, yet I do not wish to be limited thereto.

What I claim is—

The herein-described punch, consisting of the shank A and the cutting-rings B and C, having the inner wall of the outer ring and the outer wall of the inner ring inclined in opposite directions, whereby the compression upon the confined material is increased to cause its escape by elasticity, as set forth.

In testimony whereof I affix my signature in presence of two witnesses.

JAMES W. DOUBLEDAY.

Witnesses:
G. H. PRATT,
GEO. PRATT.